Sept. 8, 1959     J. M. FINALLY ET AL     2,902,875

MEANS FOR RECIPROCATING ELEMENTS OF MACHINE TOOLS AND THE LIKE

Filed Jan. 7, 1957

INVENTORS
JOHN M. FINALLY &
ERNEST H. H. GRAF
By Everett J. Wright
ATTORNEY

United States Patent Office 2,902,875
Patented Sept. 8, 1959

2,902,875

MEANS FOR RECIPROCATING ELEMENTS OF MACHINE TOOLS AND THE LIKE

John M. Finally, Rochester, and Ernest H. H. Graf, Birmingham, Mich., assignors to Detroit Broach & Machine Company, a corporation of Michigan Application January 7, 1957, Serial No. 632,813

7 Claims. (Cl. 74—409)

This invention relates to an improved method and means for driving tool slides, work table slides or other elements of machine tools and the like wherein suitable means are employed to move the slide or other element alternately in opposite directions and to remove chatter and backlash during the power or cutting stroke of the machine.

In machine tools, particularly in broaching machines wherein the tooth loading of the broach is ofttimes critical, a smooth, uniform and positive movement of the broach during the entire broaching cut on a work piece is essential to producing properly broached work pieces.

In broaching machines employing a hydraulically powered broach or work carrying slide, a smooth, uniform and positive movement of the slide during the cutting stroke is difficult to obtain because of the fact that the hydraulic power means does not respond without minute lag to the variable power demand resulting from variations of cutting tooth engagement occurring between the broach and the work piece. These variations may be caused by the different depths of cut accomplished by successive teeth of the broach, or, they may result from a different number of cutting teeth performing their cut at any one time as the broach or work carrying slide is moved on its power stroke. In mechanically powered broaching machines, a smooth, uniform and positive advance of the broach or work carrying slide during the cutting stroke may only be obtained when backlash between the rack and pinion and in the gear train driving the same is eliminated.

In the prior art, no completely satisfactory means exist for eliminating backlash in electro-mechanically driven tool slides or work slides for broaching machines and other machine tools requiring a positive, uniform movement on the power or cutting stroke of the tool carrying or work carrying slide.

With the foregoing in view, the primary object of this invention is to provide an improved method and means for driving the tool or carrying slide of broaching machines and other machine tools wherein backlash is eliminated and the slide is advanced on its power stroke with a smooth, uniform and positive movement.

Another object of the invention is to provide an improved method and electro-mechanical means for driving rack and pinion operated mechanisms wherein dual pinions each constantly in mesh with a rack and each driven by its own gear train and power means are employed to reciprocate the rack, one gear train and power means applying a positive actuating force to the rack to move it in one direction while the other gear train and power means applies anti-backlash resistance force to the said one gear train and power means.

Another object of the invention is to provide an electromechanical drive means for imparting reciprocating movement to a machine tool slide or the like consisting of dual motor and clutch driven reduction gear trains each adapted to drive one of a pair of pinions meshed with a rack fixed to said slide, each motor and clutch driven reduction gear train driving its pinion to move said rack in one of opposite directions when its clutch is engaged and the clutch of the other gear train is disengaged, the drag of the gears of the said other gear train when driven from its low speed end by its pinion responsive to movement of said rack furnishing anti-backlash resistance force to the rack, and relatively low torque means driving the said other gear train in the same direction it is driven by its pinion responsive to movement of said rack whereby to relieve a portion of the drag and anti-backlash resistance force exerted upon said rack and said one gear train by said other gear train.

A further object of the invention is to provide in a machine tool or the like including a slide having a rack fixed thereto, means for moving said slide consisting of a pair of pinions constantly meshed with said rack, dual motor and clutch driven reduction gear trains each adapted to drive one of said pinions and move said rack in one of opposite directions when its clutch is engaged and the clutch of the other gear train is disengaged, the drag of the gears of the said other gear train furnishing anti-backlash resistance force to the rack when driven in reverse through its low speed end by the movement of said rack, and auxiliary clutch controlled drive means driven by the motor of the said other motor and clutch driven reduction gear train when its main clutch is disengaged adapted to apply torque through the said other gear train and its pinion in said reverse direction to relieve excessive drag and anti-backlash resistance force exerted upon said rack and one gear train and its pinion by said other gear train and its pinion.

Other objects of the invention will be apparent by reference to the following detailed description taken in connection with the accompanying drawing, in which.

Figure 1:
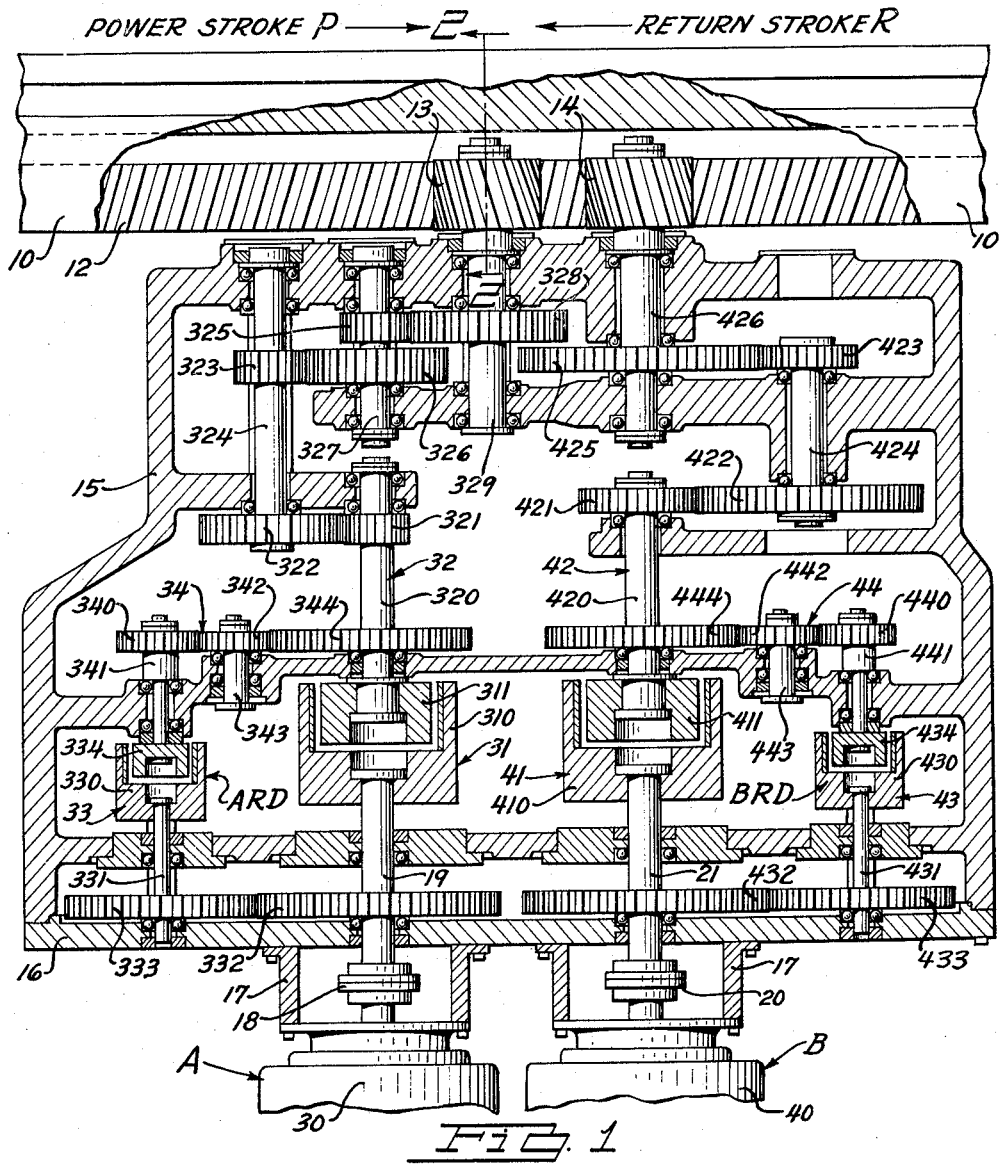
Fig. 1 is a sectional view of an electro-mechanical drive for machine tool slides and the like illustrating the invention.
Figure 2:
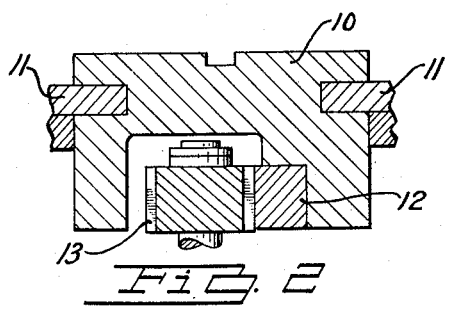
Fig. 2 is a cross sectional view taken on the line 2—2 of Fig. 1 showing a machine tool slide, a rack fixed thereto, and one of its driving pinions.

Referring now to the drawing wherein like reference characters refer to like and corresponding parts throughout the several views, an illustrative embodiment of the invention is disclosed in connection with a machine tool slide 10 which may be a tool carrying slide or a work carrying slide reciprocatingly mounted on ways 11, and has a driving rack 12 fixed thereto in any conventional manner.

A main power stroke drive means A consisting of a motor 30, a main clutch 31 and a reduction gear train 32 drives the said slide 10 on its power stroke P as indicated in Fig. 1 through a pinion 13 constantly in mesh with the rack 12. A return stroke drive means B consisting of a motor 40, a return clutch 41 and a reduction gear train 42 drives the said slide 10 on its return stroke R as indicated in Fig. 1 through a pinion 14 constantly in mesh with the said rack 12.

When the said slide 10 is being driven by the main power stroke drive means A on its power stroke P, the rack 12 drives or tends to drive the gear train 42 from its low speed end through the pinion 14. The resistance of the gear train 42 to being driven in reverse by the rack 12 and pinion 14 through its low speed shaft 426, sometimes called drag, develops anti-backlash forces in the main power stroke drive means A. This anti-backlash force is regulated by applying sufficient torque to the high speed shaft 420 of the gear train 42 through an auxiliary reverse drive means BRD consisting of an auxiliary clutch 43 and an auxiliary reverse gear train 44 which drives the main reduction gear train 42 in reverse with a suitable amount of torque to relieve so much of the drag in the said gear train 42 as may be required to permit the slide 10 to be driven on its power stroke P by its said main power stroke drive means A and at the same time maintain a suitable anti-backlash force on the said drive means A.

When the slide 10 is being driven on its return stroke R by the return stroke drive means B, an auxiliary reverse drive means ARD consisting of an auxiliary clutch 33 and an auxiliary reverse gear train 34 preferably applies sufficient reverse torque to the main reduction gear train 32 through its high speed shaft 320 to completely relieve any resistance to the driving of the pinion 13 by the rack 12 during the return stroke R of the slide 10. Thusly, the return stroke drive means B is free to move the slide 10 on its return stroke R without resistance from the power stroke drive means A.

In the illustrative embodiment of the invention shown in the drawing, the main power stroke drive means A, the return stroke drive means B, and the auxiliary reverse drive means ARD and BRD are preferably incorporated in a single power unit consisting of a gear box 15 having a cover 16 onto which motor brackets 17 are removably secured.

The main power stroke drive means A has its motor 30 connected by a flexible coupling 18 to a clutch drive shaft 19 which drives the drive element 310 of the clutch 31. The driven element 311 of the said clutch 31 drives the high speed shaft 320 of the reduction gear train 32 consisting of a gear 321 on the said high speed shaft 320, gears 322 and 323 on a jack shaft 324, gears 325 and 326 on a jack shaft 327, and a gear 328 on the low speed shaft 329 thereof, the said low speed shaft 329 extending from the gear box 15 and has the pinion 13 keyed thereon.

The return stroke drive means B has its motor 40 connected by a flexible coupling 20 to a clutch drive shaft 21 which drives the drive element 410 of the clutch 41. The driven element 411 of the said clutch 41 drives the high speed shaft 420 of the reduction gear train 42 consisting of a gear 421 on the said high speed shaft 420, gears 422 and 423 on a jack shaft 424, and a gear 425 on the low speed shaft 426 thereof, the said low speed shaft 426 extending from the gear box 15 has the pinion 14 keyed thereon.

The said low speed shafts 329 and 426 are preferably located closely adjacent each other. The gear box 15 is mounted adjacent the rack 12 fixed to the slide 10, and the said low speed shafts 329 and 426 are so spaced as to permit either pinion 13 or 14 respectively to drive the rack 12 responsive to the main power stroke drive means A or the return stroke drive means B respectively, the said rack 12 simultaneously driving or tending to drive the other or non-driven pinion.

The said auxiliary reverse drive means ARD preferably consists of an auxiliary clutch 33 which has a drive element 330 mounted on the end of a jack shaft 331 which is constantly driven by the motor 30 through a gear 332 on the high speed drive shaft 19 and a gear 333 on the said jack shaft 331. The driven element 334 of the auxiliary clutch 33 drives the high speed shaft 320 of the reduction gear train 32 through an auxiliary reverse gear train 34 in a direction reverse to the direction in which it is driven by the driven element 311 of the clutch 31. The said auxiliary reverse gear train 34 consists of a gear 340 on the high speed auxiliary drive shaft 341 driven by the said driven element 334 of the auxiliary clutch 33, a gear 342 on a stub shaft 343, and a gear 344 keyed on the high speed shaft 320 of the said reduction gear train 32.

The said auxiliary reverse drive means BRD preferably consists of an auxiliary clutch 43 which has a drive element 430 mounted on the end of a jack shaft 431 which is constantly driven by the motor 40 through a gear 432 on the high speed drive shaft 21 and a gear 433 on the said jack shaft 431. The driven element 434 of the auxiliary clutch 43 drives the high speed shaft 420 of the reduction gear train 42 through an auxiliary reverse gear train 44 in a direction reverse to the direction in which it is driven by the driven element 411 of the clutch 41. The said auxiliary gear train 44 consists of a gear 440 on the high speed auxiliary drive shaft 441 driven by the said driven element 434 of the auxiliary clutch 43, a gear 442 on a stub shaft 443, and a gear 444 on the high speed shaft 420 of the said reduction gear train 42.

The motor 40 may be of considerably less horsepower than the motor 30 inasmuch as less torque is required to move the slide on its return stroke R than on its power stroke P. Also, inasmuch as the torque required to relieve the drag of the gear trains 32 and 42 when they are driven from their low speed ends by the rack 12 and pinions 13 and 14 respectively is relatively small, the torque transmitting capacity of the auxiliary clutches 33 and 43 is correspondingly low.

One complete cycle of operation of the electro-mechanical drive means disclosed herein for the purpose of illustrating the invention will now be described. With both motors 30 and 40 running and the slide 10 disposed in its retracted position, the clutch 31 of the main power stroke drive means A and the auxiliary clutch 43 of the auxiliary reverse drive means BRD are engaged simultaneously. Inasmuch as the torque applied by the auxiliary reverse drive means BRD to drive the gear train 42 in reverse is less than sufficient to overcome all of the drag of the gear train 42 of the return stroke drive means B, the main power stroke drive means A, the pinion 13 and rack 12 drive the slide 10 on its power stroke P while the remaining resistance of the gear train 42 to being driven by the rack 12 and pinion 14 applies anti-backlash forces to the main power stroke drive means A including the rack 12 and pinion 13. By applying more or less torque through the auxiliary clutch 43 of the reverse drive means BRD to drive the gear train 42 in reverse, the amount of anti-backlash force applied to the main power stroke drive means may be regulated. After the completion of the power stroke P, both clutches 31 and 43 are disengaged, and, to drive the slide 10 on its return stroke R, the clutch 41 of the return stroke drive means B and the auxiliary clutch 33 of the auxiliary reverse drive means ARD are engaged simultaneously. Inasmuch as the torque applied by the auxiliary reverse drive means ARD is sufficient to overcome all of the drag of the gear train 32 of the main power stroke drive means A, the return stroke drive means B, the pinion 14 and the rack 12 drive the slide 10 freely on its return stroke R.

In the event the resistance of the gear train 42 to being driven in reverse by the rack 12 and pinion 14 through its low speed shaft 426 is not of an adequate magnitude to provide sufficient anti-backlash force to overcome backlash in the power stroke drive means A, the pinion 13, and rack 12 during the power stroke P, then, rather than engage the auxiliary clutch 43 and actuate the auxiliary drive means BRD to lessen the anti-backlash force created by drag in the gear train 42 when driven in reverse by the rack 12 through its low speed shaft 426, the clutch 41 is engaged to the extent necessary to cause the return stroke drive means B to provide the required anti-backlash force. Thus, the return stroke drive means B increases the resistance of the gear train 42 to being driven in reverse by the rack 12 and pinion 14 through its low speed shaft 426.

Whenever the resistance of the gear train 42 to being driven in reverse by the rack 12 and pinion 14 through its low speed shaft 426 is not adequate to provide sufficient anti-backlash force to overcome backlash in the power stroke drive means A, the pinion 13 and the rack 12, a preferred complete cycle of operation of the electro-mechanical drive means disclosed herein would be as follows. With both motors 30 and 40 running and the slide 10 disposed in its retracted position, the clutch 31 of the main power stroke drive means A is engaged, and the clutch 41 of the return stroke drive means B is engaged to the extent required to apply the necessary anti-backlash force to the gear train 32, the pinion 13 and rack 12 through the gear train 42 and pinion 14. By applying more or less torque through the clutch 41 of the return stroke drive means B to tend to drive slide 10 in its return strike direction by the said return stroke drive means B; the pinion 14 and the rack 12, the amount of anti-backlash force applied to the main power stroke drive means may be regulated. After the completion of the power stroke P, both clutches 31 and 41 are disengaged, and, to drive the slide 10 on its return stroke R, the clutch 41 of the return stroke drive means B and the clutch 33 of the auxiliary reverse drive means ARD are engaged simultaneously. Inasmuch as the torque applied by the auxiliary reverse drive means ARD is sufficient to overcome all of the drag of the gear train 32 of the main power stroke drive means A, the return strike drive means B, the pinion 14 and the rack 12 drive the slide 10 freely on its return stroke R. If no interval of time is required between the power stroke P and the return stroke R, then, the clutch 31 is disengaged and the clutch 33 of the auxiliary reverse drive means ARD is engaged simultaneously upon the completion of the said power stroke P, and the return stroke R is accomplished automatically by the return stroke drive means B with the drag of the gear train 32 eliminated by the auxiliary reverse drive means ARD.

Obviously, the arrangement of the main and auxiliary gearing of the main power stroke drive means A and its auxiliary reverse drive means ARD, and the arrangement of the main and auxiliary gearing of the return stroke drive means B and its auxiliary reverse drive means BRD may be altered to suit the requirements of any particular machine in which slide drive method and means of the invention may be incorporated.

The main drive clutches 31 and 41 and the auxiliary reverse drive clutches 33 and 43 may be of any type or design to accomplish the application of power from the motors 30 and 40 to the reduction gear trains 32 and 42 respectively, and to apply the required amount of power to the auxiliary reverse gear trains 34 and 44. Obviously, any suitable type or design of clutch means may be employed to apply the required amount of power to the gear train 42 in the event the resistance of the said gear train 42 to being driven in reverse by the rack 12 and pinion 14 through its low speed shaft 426 is not sufficient to provide the required anti-backlash force to overcome backlash in the power stroke drive means A, the pinion 13 and rack 12 during the power stroke P. For example, hysteresis clutches, magnetic clutches or other types of controllable electrical, mechanical or hydraulic power transmitting means may be used as required to transmit and control the transmission of power from the power source to the main reduction gear trains 32 and 42 and the auxiliary reverse gear trains 34 and 44. It is well known that hysteresis clutches and magnetic clutches including magnetic particle clutches are generally controlled by rheostat means to regulate the amount of torque transmitted thereby. Also, in hydraulic clutches or transmissions, the amount of torque transmitted is varied by such means as regulating the amount of fluid in the drive or by varying the distance between the vanes of the fluid coupling. Also, if desired, variable torque electric motors may be employed as controllable variable torque power transmitting means, which are controlled as to torque output according to well known practices. Inasmuch as the particular means employed to control the clutches or other power transmitting means may be selected from a wide variety of prior art controls available for such purposes, and since such controls do not form a part of the instant invention, none have been shown and described in detail.

Although but a single illustrative embodiment of the invention has been disclosed and described in detail, it is obvious that many changes may be made in the method steps and that many modifications may be made in the size, shape, arrangement and detail of the various elements thereof, all without departing from the spirit and scope of the invention as defined by the appended claims.

We claim:

1. Electro-mechanical drive means for machine tool slides including a rack therealong comprising a power stroke pinion and a return stroke pinion constantly meshed with said rack, a power stroke drive means consisting of motor and clutch driven reduction gear train driving said power stroke pinion to move said slide in one direction on its power stroke when its clutch is engaged, an independent return stroke clutch driven reduction gear train driving said return stroke pinion to move said slide in the opposite direction on its return stroke when its clutch is engaged, the resistance of the gears of the return stroke gear train to being driven from its low speed end by the rack and the return stroke pinion during the power stroke of said slide functioning to eliminate backlash during the said power stroke of the machine tool slide, and an auxiliary clutch controlled means for applying a torque to the said return stroke reduction gear train in a direction to lessen the resistance thereof to being driven by said rack and return stroke pinion whereby to control the amount of anti-backlash force applied by the said gear resistance during the power stroke of the said slide.

2. Electro-mechanical drive means for machine tool slides including a rack therealong comprising a power stroke pinion and a return stroke pinion constantly meshed with said rack, a power stroke drive means consisting of motor and main clutch driven reduction gear train driving said power stroke pinion to move said slide on its power stroke when its clutch is engaged, an independent return stroke drive means including a return stroke main clutch driven reduction gear train driving said return stroke pinion to move said slide on its return stroke when its clutch is engaged, the resistance of the gears of the return stroke gear train to being driven from its low speed end by the rack and the return stroke pinion during the power stroke of said slide functioning to eliminate backlash during the said power stroke of the machine tool slide, and a clutch controlled auxiliary means for applying a torque to the said power stroke reduction gear train to eliminate the resistance thereof to being driven by said rack and the power stroke pinion when said power stroke clutch is disengaged and said return stroke clutch is engaged.

3. Electro-mechanical drive means for machine tool slides including a rack therealong comprising a power stroke pinion and a return stroke pinion constantly meshed with said rack, a power stroke drive means consisting of motor and main clutch driven reduction gear train driving said power stroke pinion to move said slide on its power stroke when its clutch is engaged, a return stroke drive means consisting of a return stroke motor and main clutch driven reduction gear train driving said return stroke pinion to move said slide on its return stroke when its clutch is engaged, and clutch controlled auxiliary means for applying torque selectively to each of said main clutch driven reduction gear trains to eliminate the resistance of the gears of either gear train to being driven by the rack and pinion of the other driven gear train when the clutch thereof is engaged.

4. Electro-mechanical drive means for machine tool slides including a rack therealong comprising a power stroke pinion and a return stroke pinion constantly meshed with said rack, a power stroke drive means consisting of motor and clutch driven reduction gear train driving said power stroke pinion to move said slide on its power stroke when its clutch is engaged, a return drive means including a return stroke clutch driven reduction gear train driving said return stroke pinion to move said slide on its return stroke when its clutch is engaged and said power stroke drive clutch is disengaged, said return stroke drive means applying anti-backlash force to said power stroke gear train, its pinion and said slide through said rack when both the power stroke drive means clutch and the return stroke drive means clutch are engaged, and auxiliary means for applying sufficient torque to said power stroke gear train to eliminate the resistance thereof to being driven in reverse by the said rack and its pinion during the return stroke of said slide when the return stroke clutch is engaged and the power stroke clutch is disengaged.

5. An anti-backlash drive for the power stroke of a tool slide including a rack mounted thereon, a power stroke reduction gear driven pinion drive means and a return stroke reduction gear driven pinion drive means constantly meshed with said rack, each said reduction gear driven pinion drive means having a certain substantial resistance to being driven by said slide when said slide is driven by the other reduction gear driven pinion drive means, means for applying power to said power stroke reduction gear driven pinion drive means to move said slide on its power stroke tending to drive said return stroke reduction gear driven pinion drive means against its said certain resistance to being driven thereby whereby to establish an anti-backlash force in said power stroke drive means, and means for applying power to said return stroke reduction gear driven pinion drive means in a selected direction and magnitude to regulate the amount of backlash force affecting said power drive means.

6. An anti-backlash drive for the power stroke of a tool slide including a rack mounted thereon, a power stroke reduction gear driven pinion drive means and a return stroke reduction gear driven pinion drive means constantly meshed with said rack, each said reduction gear driven pinion drive means having a certain substantial resistance to being driven by said slide when said slide is driven by the other reduction gear driven pinion drive means, means for applying power to said power stroke reduction gear driven pinion drive means to move said slide on its power stroke tending to drive said return stroke reduction gear driven pinion drive means against its resistance to being driven thereby whereby to establish an anti-backlash force in said power stroke drive means, and means for applying a selected torque to said return stroke reduction gear driven pinion drive means to drive the same in the direction it is normally driven whereby to increase the said anti-backlash force.

7. An anti-backlash drive for the power stroke of a tool slide including a rack mounted thereon, a power stroke reduction gear driven pinion drive means and a return stroke reduction gear driven pinion drive means constantly meshed with said rack, each said reduction gear driven pinion drive means having a certain substantial resistance to being driven by said slide when said slide is driven by the other reduction gear driven pinion drive means, means for applying power to said power stroke reduction gear driven pinion drive means to move said slide on its power stroke tending to drive said return stroke reduction gear driven pinion drive means against its resistance to being driven thereby whereby to establish an anti-backlash force in said power stroke drive means, and means for applying a selected torque to said return stroke reduction gear driven pinion drive means to drive the same in a direction opposite to the direction in which it is normally driven whereby to decrease the said anti-backlash force.

References Cited in the file of this patent
UNITED STATES PATENTS

| | | |
|---|---|---|
| 1,492,627 | Cole | May 6, 1924 |
| 1,515,869 | Moyer | Nov. 18, 1924 |
| 1,570,372 | Buckingham | Jan. 19, 1926 |